WOODWORTH & WETHERED.
Gas Burner.
No. 28,708.
Patented June 12, 1860.
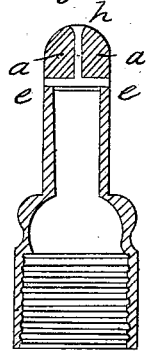
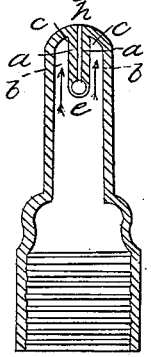
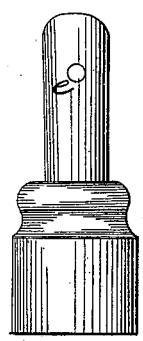

UNITED STATES PATENT OFFICE.

S. E. WOODWORTH AND J. S. WETHERED, OF SAN FRANCISCO, CALIFORNIA.

GAS-BURNER.

Specification of Letters Patent No. 28,708, dated June 12, 1860.

*To all whom it may concern:*

Be it known that we, SELIM E. WOODWORTH and JAMES S. WETHERED, of the city and county of San Francisco and State of California, have invented a new and Improved Gas Burner, which we call "Woodworth and Wethered's Aerioflame Gas-Burner;" and we do hereby declare that the following is a full, clear, and exact description of the construction and operation of the same, reference being had to the annexed drawings, making a part of this specification.

Figure 1, is an exterior view of the burner; Figs. 2 and 3 are sectional views.

$a$, is a solid piece of metal, across the top of the burner, forming a partition across the same, with compartments each side as represented at $b$; $c$, $c'$, are slits or openings for the emission of gas. The partition $a$, has a hole through it as represented at $e$, with a hole $h$, perpendicular to, and connecting with the same. It will be perceived that the gas passing in the direction of the arrows, is emitted at the openings $c$, $c'$. The atmospheric air passing in at the openings $e$, $e'$, escapes at $h$, and is mixed with the gas, supplying oxygen, thereby increasing the illuminating power.

We do not claim the mixture of atmospheric air with illuminating gas, for the purpose of increasing its illuminating power.

What we claim and for which we desire Letters Patent to issue, is—

The introduction of atmospheric air into the center of the gas flame, in manner substantially as described, and for the uses and purposes herein set forth.

S. E. WOODWORTH.
JAS. S. WETHERED.

Witnesses:
GEO. W. MILLER,
F. I. THIBAULT.